United States Patent [19]
Doncer et al.

[11] 3,919,088
[45] Nov. 11, 1975

[54] ROTARY VACUUM FILTER
[75] Inventors: Alexander J. Doncer, Burbank; Harold R. White, New Lenox, both of Ill.
[73] Assignee: Alar Engineering Corporation, Burbank, Ill.
[22] Filed: Mar. 22, 1974
[21] Appl. No.: 453,796

[52] U.S. Cl. ............... 210/402; 210/408
[51] Int. Cl.² ........................ B01D 33/06
[58] Field of Search ....... 210/75, 77, 208, 280, 402, 210/406, 407, 408, 153, 154, 158; 259/20, 38, 100, 101, DIG. 11, DIG. 12

[56] References Cited
UNITED STATES PATENTS

| | | | |
|---|---|---|---|
| 329,443 | 11/1885 | Day | 259/100 |
| 2,101,810 | 12/1937 | Lischer | 259/100 X |
| 2,715,466 | 8/1955 | Esposito, Jr. | 210/75 |
| 2,936,073 | 5/1960 | Thompson | 210/77 X |
| 2,936,073 | 5/1960 | Thompson | 210/77 X |
| 3,037,632 | 6/1962 | Dujardin | 210/402 X |
| 3,244,281 | 4/1966 | Kurz et al. | 210/402 X |
| 3,263,816 | 8/1966 | Krynski | 210/402 X |
| 3,466,016 | 9/1969 | Jablon | 259/20 X |

Primary Examiner—Theodore A. Granger
Attorney, Agent, or Firm—Hill, Gross, Simpson, Van Santen, Steadman, Chiara & Simpson

[57] ABSTRACT

An improved rotary vacuum filter assembly of the so-called precoat type including particularly an improved drum assembly used therein which avoids the complex piping and compartmentallization previously used in assemblies of this type.

8 Claims, 8 Drawing Figures

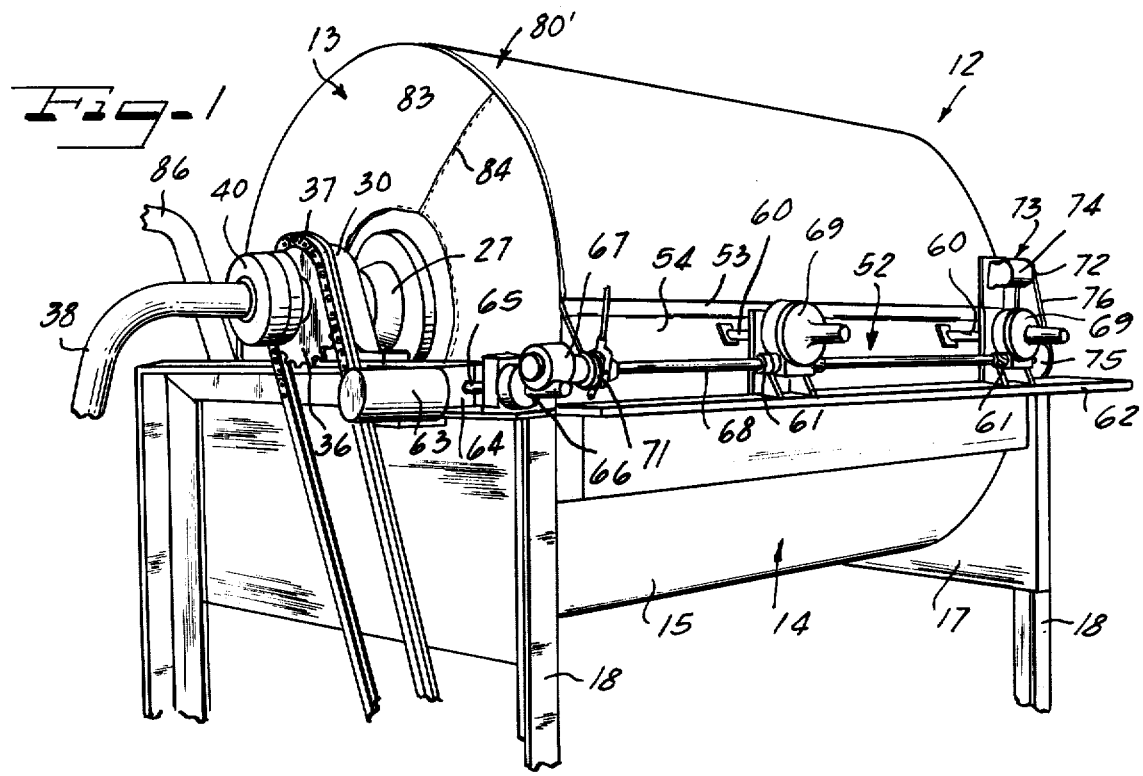
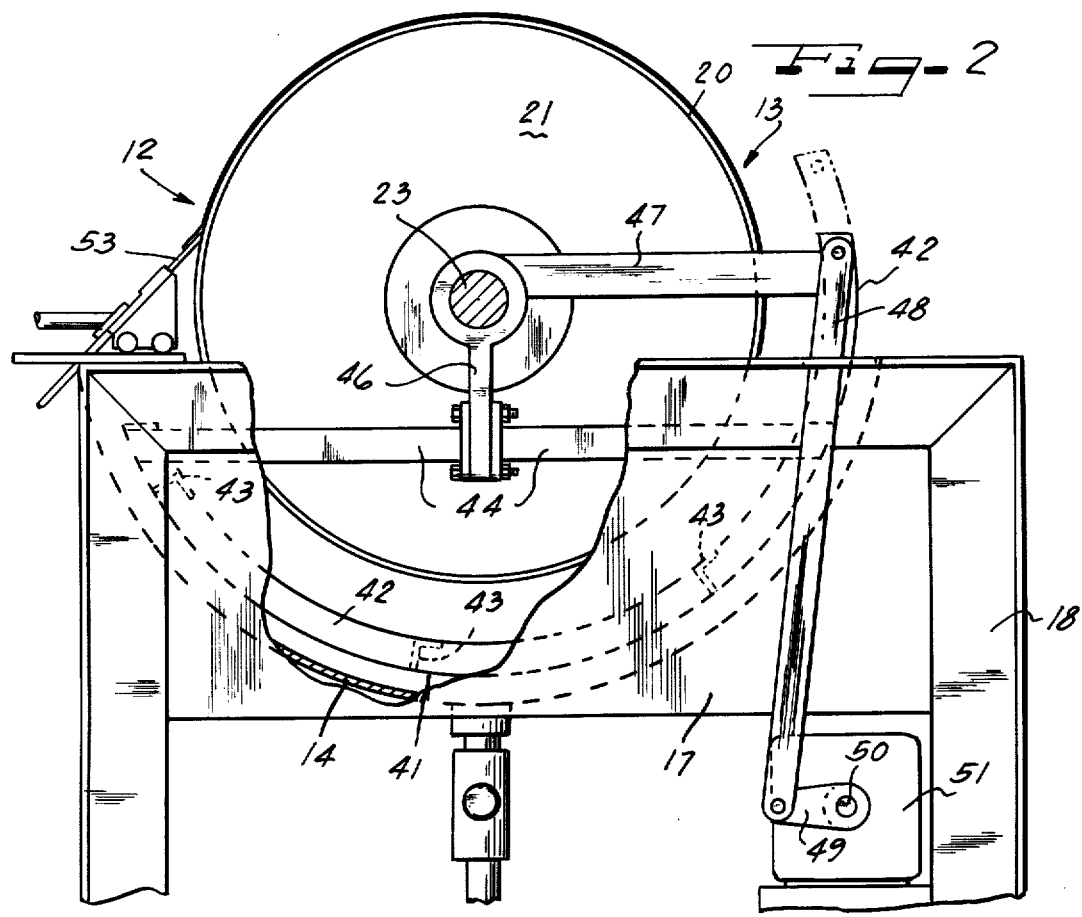

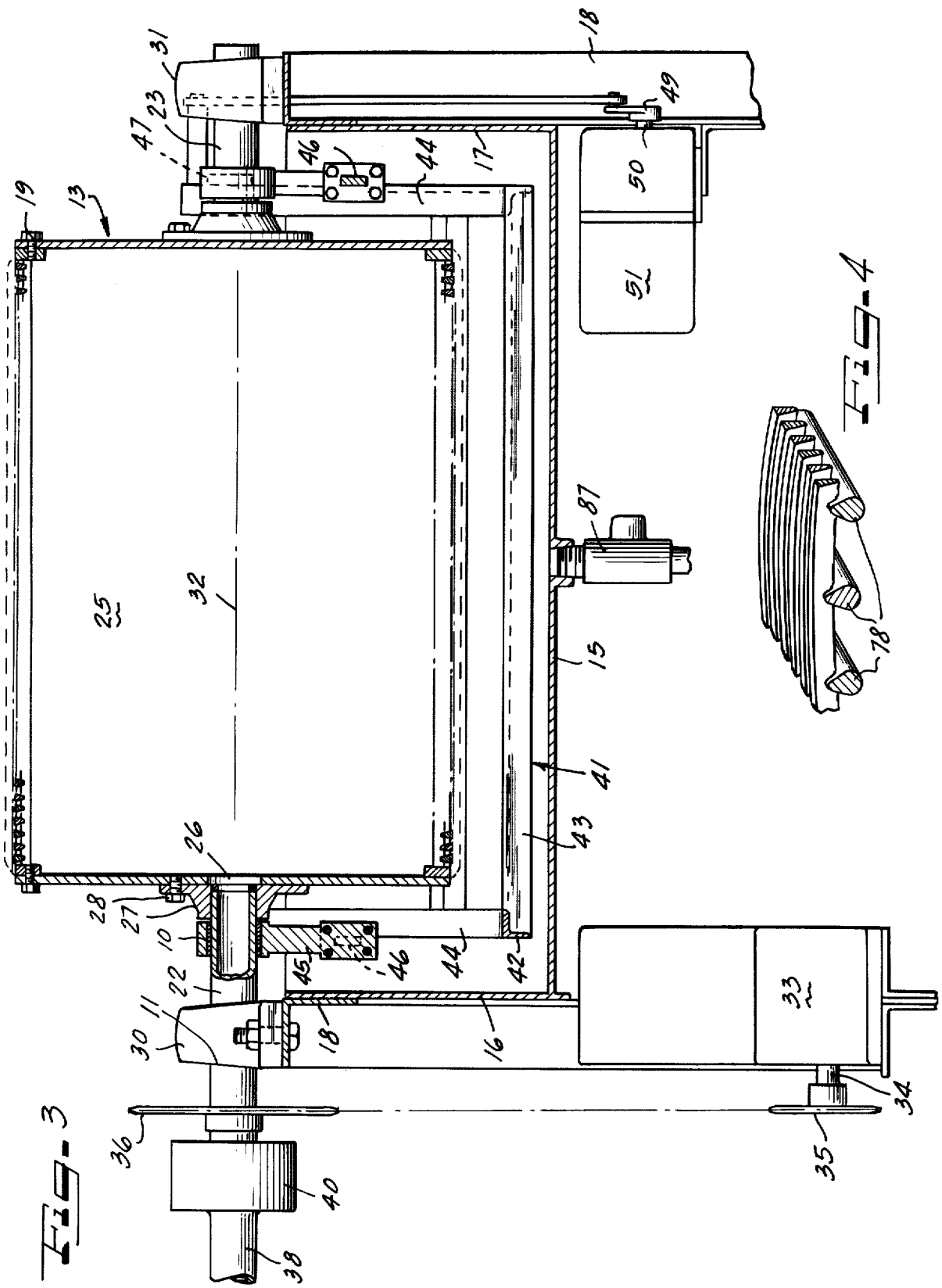

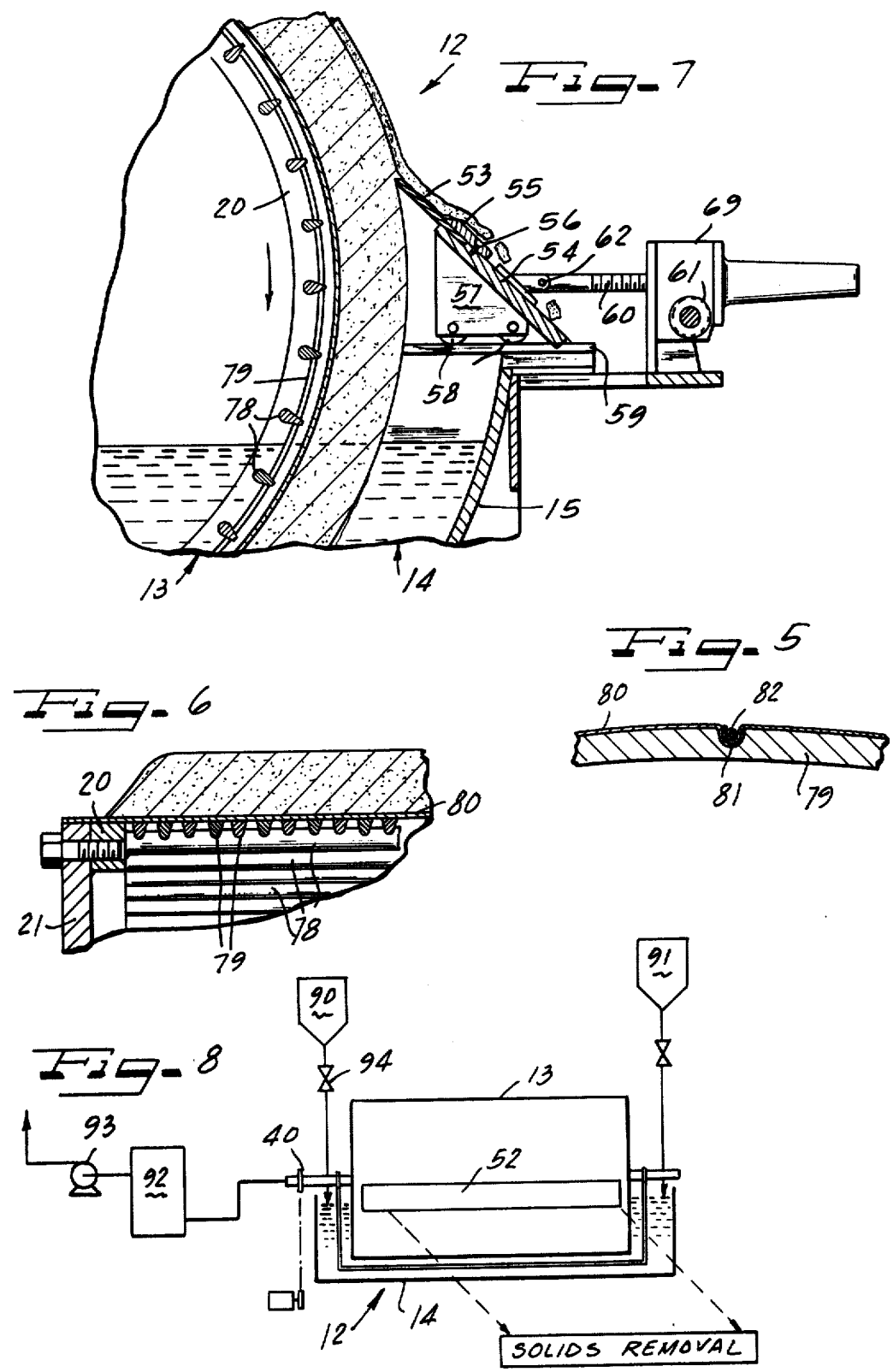

ROTARY VACUUM FILTER

BACKGROUND OF THE INVENTION

The oldest and most popular continuous vacuum filter is perhaps the conventional rotary drum. Characteristically, in such an assembly the position of the drum in the tank thereof is such that the drum lower portion is confined within the tank walls while the upper portion is exposed above. The ends of the drum are either open spiders or closed heads which carry the two main trunnions by means of which the drum is supported. The shell of the drum is composed characteristically of a number of shallow compartments covered circumferentially with drainage grid means and a filter cloth, the latter typically being in panneled sections and held in place by lateral caulking or the like. Grid means are typically made of wood, perforated sheet metal, cast metal or plastic.

The interior of each compartment communicates through a separate conduit to a valve mechanism which, during operation of the assembly, automatically supplies either suction or positive air pressure to the many conduits thus in a given drum in rotation, and, through them in turn, to the interior of each compartment adjacent circumferential exterior portions of the drum. The valve is connected to a vacuum system and to a source of compressed air.

During assembly operation, the drum operates slowly while the tank is supplied with a fluid material to be filtered, and the fluid level is maintained to insure a constant depth of submergance in the lower portion of the filter drum. Through the action of the automatic valve, vacuum is applied to those compartments of the drum passing through the fluid. The vacuum created within the compartments causes a flow of filtrate through the filter medium, conduits, and automatic valve, and a layer of cake solids is deposited upon the filter medium covering the submerged portion of the drum.

As the drum revolves, the vacuum in the compartments is maintained, and the layer of cake solids emerges and passes through the arc included by the upper or exposed portions of the drum. The filter cake is usually discharged from the drum surface by a scraper blade, although various techniques for cake production and removal are employed.

The compartmentalized drum construction employed requires that the interior of the drum be of relatively complex construction. Each compartment interconnected with the others, as indicated, and adapted to go through the same controlled cycle of operation (filtering, dewatering, and cake discharge) in a rotating, repeating sequence under control by the automatic valve. Inherently, the construction of a drum is expensive, and maintenance thereof can be appreciable. The automatic valve assembly employed likewise adds to costs of equipment manufacture, maintenance, and operation. These complexity and cost considerations have tended to limit utilization of continuous rotary vacuum drum filter assemblages. There is a real and long felt need in the art for a simple effective, reliable, economically constructed and economically maintenable rotary vacuum filter system.

BRIEF SUMMARY OF THE INVENTION

The present invention provides an improved rotary vacuum filter assembly of the so-called precoat type. The invention overcomes the above-indicated shortcomings of the prior art and provides a new and very useful system having wide potential applicability in a variety of filtration situations, and particularly in those applications where precoat vacuum filters are employed, such as for filtration operations requiring a high degree of clarity in the filtered liquid, or where the solids filter poorly on themselves (e.g. some slurry solids "blind" or choke off the filtering action). This filter assembly utilizes a filter-aid (such as diatomaceous earth or the like) to build up a filter cake on a surface of the rotating drum during assembly operation.

The present invention thus provides a rotary vacuum filter having an improved and simplified drum, which is adapted for use in precoat filter operations.

Such drum assembly is adapted for use in a rotary vacuum filter and avoids the use of the shallow, compartmentalized drum construction heretofore employed in the rotary vacuum filter art and all of the associated conduit and valving arrangements utilized therein.

Such a drum assembly is adapted for use in a rotary vacuum filter which has a vacuumizable hollow interior and whose circumferential surface portions are adapted for coating with a filter aid layer built up as a filtering cake on such circumferential portions of the drum during operation thereof. Other and further advantages will be apparent to those skilled in the art from a reading of the present invention taken with the present specification and drawings.

BRIEF DESCRIPTION OF DRAWINGS

In the drawings:

FIG. 1 is a perspective view of an embodiment of a rotary vacuum filter apparatus of the present invention incorporating an embodiment of a rotary drum of the present invention;

FIG. 2 is an end elevational view of the apparatus shown in FIG. 1, some parts thereof being shown in section, and some parts thereof being broken away;

FIG. 3 is a longitudinal sectional view through the apparatus of FIG. 1, some parts thereof broken away;

FIG. 4 is an enlarged fragmentary, detail perspective view illustrating construction of circumferential surface portions of the drum member in the embodiment of FIG. 1;

FIG. 5 is an enlarged, fragmentary detail, vertical sectional view transversely taken through a portion of the circumferential surface of the drum member employed in the embodiment of FIG. 1;

FIG. 6 is an enlarged, fragmentary detail view in longitudinal section taken at an end region of the rotary drum member employed in the embodiment of FIG. 1 during operation thereof;

FIG. 7 is a partially schematic view in fragmentary, transverse section through the embodiment of FIG. 1 illustrating removal of filter cake from circumferential drum surface portions during operation of such embodiment;

FIG. 8 is a flow diagram of the embodiment of FIG. 1.

DETAILED DESCRIPTION

Turning to the drawings, there is seen, in FIGS. 1 through 8 an embodiment of a rotary filter assembly of the present invention, herein designated in its entirety by the numeral 12. Assembly 12 incorporates an elongated rotary drum 13 revolvably suspended in and over an elongated tank 14. The tank 14 has a cross-sectionally generally hemicircular combined side and bottom wall 15 and a pair of longitudinally spaced end walls 16 and 17 each secured to a different opposite end of wall 15. In the embodiment shown the end walls 16 and 17 each have a rectangular configuration which adapts their prodruding side edge portions for mounting tank 14 to a frame 18. Tank 14 is thus adapted to open upwardly and also has its center line 32 extending horizontally.

The drum 13 has a cylindrical side wall 20 which is in the nature of a screen member that is adapted for the passage of fluid therethrough. A pair of plate-like end walls 21 are secured each one to a different opposite end of the cylindrical member 20 sy cap screws 19, though welding, clamping means, or the like may be alternatively employed if desired. The axis of drum 13 preferably coincides with the center line 32 of tank 14.

A pair of shafts 22 and 23 are provided for drum 13, each shaft outwardly extending from a different one of the end walls 21 axially with respect to the drum 13. One shaft 22 is hollow and communicates with the interior 25 of drum 13 through an aperture 26 in the associated end wall 21 so that fluid can pass therethrough from the interior of drum 13. In the embodiment shown, each shaft 22 and 23 is secured to respective end walls 16 and 17 by means of a neck flange 27. Each flange 27 is secured to its associated end wall 21 by means of cap screws 28, or the like, and each flange 27 is secured to its respective shaft 22 and 23 by means of welding (not shown) or the like.

Each shaft 22 and 23 is adapted to be equipped with a pair of bearing surface means 10 and 11, one such bearing surface means 10 on each shaft 22 and 23 being in adjacent relationship to the associated end wall 21 of drum 13, and the other bearing surface means 11 on each shaft 22 and 23 being in adjacent relationship to the respective outward end thereof, each for utilization as will be seen from the following discussion.

The outermost bearing means 11 on each shaft 22 and 23 is a pillow block adapted for mounting in bearing housings 30 and 31 located at each end of the tank 14 and secured respectively to frame 18. The bearing housings 30 and 31 are adapted to rotatably support the respective shafts 22 and 23 so that the axis of drum member 13 coincides with the center line 32 of the tank 14.

To rotatably drive the drum 13 a motor 33 is provided whose drive shaft 34 is equipped with a sprocket 35. Sprocket 35 is aligned with a sprocket 36 mounted on the shaft 22. When a drive chain 37 extends about the peripheries of the respective sprockets 35 and 36 and the motor 33 is operating, the sprockets 35 and 36 are so sized that the drum assembly 13 is revolved at a desired speed. Any convenient drive means for drum 13 may be used.

A fluid pump means (not shown) adapted to generate subatmospheric pressures is provided. This pump means includes a powerhead and is conventional in construction and operation. The pump means is interconnected with the terminal end of hollow shaft 22 through a conduit 38. Conduit 38 is coupled to the shaft 22 by means of a rotary joint 40. The rotary joint 40 can be of any conventional type which permits a fluid to be transported and conveyed from the end of a rotating member into a stationary member such as the conduit 38.

In order to prevent particulate solids in a fluid material being filtered through the apparatus 12 from settling to the bottom of tank 14 during operation, it is much preferred to equip assembly 12 with agitation means. In the embodiment 12, such agitation means is provided by a curved, longitudinally extending agitator 41. The agitator 41 is formed of a pair of longitudinally spaced, inwardly curved channel iron members 42, one such member 42 being at each end of the interior of tank 14. and a plurality of longitudinally extending circumferentially spaced channel iron members 43 extend between the respective members 42 and are secured thereto by means of welding or the like. The agitator 41 is suspended from the respective shafts 22 and 23 in spaced relationship to the inside and bottom wall portions of tank 14. Such suspension here is achieved by means of a cross beams 44 which transversely extend between the respective upper ends of each member 42 and are secured at their respective mid regions to a short radially extending (relative to drum 13) leg 45 and 46.

Each leg 45 and 46 is pivotally mounted upon each shaft 22 and 23 respectively, and on the bearing surfaces 10 thereof. Leg 46 interconnects with a long leg 47 so that the two legs 46 and 47 form a bell crank. The terminal end of leg 47 is conveniently for reasons of strength and stability joined to a corner of agitator 41. Such end of leg 47 also connects to the end of a link 48 pivotally. Link 48 extends between the end of long leg 47 and the moving end of drive crank 49. In turn, the revolving end of drive crank 49 is mounted on a drive shaft 50 of a motor 51. When the motor 51 is energized and the assembly 12 is operating, an oscillatory rocking action is thus imparted to the agitator 41 which causes same to move arcuately and reciprocatorily in spaced relationship to the inside walls of tank 14. Thus, liquid material within tank 14 is agitated as desired during operation of assembly 12.

In order to remove continuously deposits of solid material collected upon the cylindrical surface portions of drum 13 during operation of assembly 12, a blade assembly 52 is employed. The blade assembly 52 includes a knife 53 which extends at an inclined angle longitudinally along cylindrical member 20. The knife 53 is clamped in position at its base to a plate 54 by means of a bar 55. Bar 55 is held against the plate 54 by means of screws 56 received into plate 54. Plate 54 is conveniently provided as shown with an appropriate groove for receipt of the knife 53 therein.

The inclined plate 54 and its associated knife 53 and bar 55 extend longitudinally beyond the respective opposed end walls 21 of drum 13. Downwardly depending from a position adjacent each opposite end of plate 54 and secured thereto by means of welding or the like is a flange member 57 (paired). Mounted along the lower edge of each flange member 57 in spaced adjacent relationship to each other is a pair of wheels 58 each wheel 58 being adapted for rotational movements about an axis generally parallel to the axis 32 of drum 13. Wheels 58 on each flange are further adapted to engage a rail 59 (paired) there being one rail 59 beyond each end wall 21 secured to frame 18, each rail 59 being radially extending relative to drum 13. The knife 53 is thus adapted to move radially relative to drum 13 towards and away from cylindrical member 20 on rails 59.

A pair of threaded bars 60 in spaced relationship to each other project radially (relative to drum 13) outwardly from plate 54. To allow for possible slight changes in attitude of plate 54, each bar 60 is provided with a pivot point 62. Each bar 60 is threaded and engages axially a threaded inner portion of a worm gear. Each such worm gear has threaded circumferential outside edge which engages a worm 61 (paired). Each such worm gear and worm 61 are supported by a different housing 69. Each housing 69 is spatially fixed and secured to a table 62 which is mounted on frame 18.

A motor 63 mounted on frame 18 has a drive shaft (not shown) which engages a right angle drive 64. The drive shaft 65 of drive 64 engages a worm 66. Worm 66, in turn, engages a worm gear 67 rigidly mounted on the end of a driven shaft 68. Driven shaft 68 extends parallel to the axis 32 of drum 13 longitudinally along the outside of cylindrical member 20, and shaft 68 has mounted thereon the worms 61 in longitudinally spaced relationship to each other. As driven shaft 68 is turned by motor 63, worms 61 on shaft 68 turn such worm gears within each housing 69 causing the bars 60 to advance radially towards the circumferential member 20 of drum 13 as desired to advance knife 53.

Because the rate of radial advance of the knife 53 is chosen to be relatively slow relative to the rotational speed of drum 13, there is a need, as a practical matter to retract knife 53 at a relatively rapid rate once the knife 53 has been fully advanced to a desired region adjacent cylindrical member 20 of drum 13. In order to provide capability for such a rapid retrieval or of the blade 53 any conventional release means may be used. Here, a clutch 71 is provided to disengage the worm gear 67 from the shaft 68. Clutch 71 is conveniently a simple, conventional, jaw-type. When the clutch 71 is opened, the motor 63, the right angle drive 64, the shaft 65, the worm 66 and the worm gear 67 are disengaged from the shaft 68.

While the knife 53 could be retracted by any convenient means, including manually, upon disengagement of a release means, such as clutch 71, in the embodiment shown, a quick reverse drive arrangement 73 for reversibly moving the blade 53 away from the drum 13 is provided. This quick reverse drive 73 utilizes a motor 74 fixed to table 62. The motor 74 has a pulley 72 mounted on its drive shaft (not shown) and an aligned pulley 75 is affixed to the terminal end of shaft 68. A V-belt 76 is mounted about pulleys 75 and 72. When the motor 74 is actuated, the pulley 75 turns and revolvably moves the shaft 68 in the direction causing retraction of the plate 54 and blade 53 from the vicinity of the cylindrical member 20 of drum 13. The pulley ratios involved permit the operating motor 74 to rapidly recall the knife 53 to a chosen starting position compared to the speed at which the motor 63 advances knife 53.

The construction of cylindrical member 20 is illustrated in FIGS. 4 and 5 and 6, though any convenient screen structure may be employed therefor. Here member 20 is comprised of a series of bearing strips 78 in spaced parallel relationship to each other which have welded transversely across the top edges thereof a plurality of spaced parallel support rods 79. The support rods 79 are conveniently notched before welding for engagement with the bearing strips 78. Because the apertures between adjacent support rods 79 between strips 78 are very much larger than the customary size of the particles typically to be filtered, and also very much larger than the particle size of the filter aid material typically employed, it is usual to mount over the outer circumferential surface portions of the support rods 79 a cloth or screen member 80. One means of securing the screen member 80 across the tops of the support rods 79 a cloth or fine screen 80 is illustrated in FIG. 5. To hold this cloth in position, a groove 81 is transversely cut through the support rods 79 and after the cloth 80 is extended about rods 79, a string or wire member 82 is tamped into the groove 81 which serves to clamp the cloth 80 against the rods 79. Any convenient clamping means for cloth 80 against rods 79 may be employed, and, alternatively, a cloth 80' as shown in FIG. 1 may be stitched in place over drum 13 by means of end members 83 and seams 84.

A liquid material containing dispersed or suspended solids therein to be filtered and separated from the liquid thereof is charged to tank 14 through a pipe 86 feeding tank 14 at an upper portion thereof. For cleanout purposes an outlet pipe 87 is provided in the bottom of tank 14. As those skilled in the art will appreciate, the assembly 12 can be formed of steel, cast iron, coated steel, stainless steel, other metal alloys, glass reinforced plastic, and the like. Cloth covers for the drum 13 can be formed in a wide variety of natural and synthetic textiles, wool and wire cloth, and finelly perforated metal sheets.

In operation, the drum 13 slowly rotates, typical r.p.m's being in the range of from about 0.5 to 10.0. while the tank 14 is supplied with a liquid material to be filtered. The level of material in tank 14 is maintained to insure a constant depth of submergence of the lower portion of the drum 13. Typically, this depth may be set between the limits ranging from 0 to almost complete submersion of the drum provided that in any given embodiment the blade assembly remains above the level of liquid being filtered.

Preferably, a tank 14 is filled with water or other liquid to be filtered to a level such that the angle which the surface of the material liquid being filtered or processed makes with a cylindrical surface portions 20 ranges from about 30° to 120°. The scraper blade used is advanced at a rate preferably of from about 0.0001 to 0.001 inches per minute, generally radially with respect to the drum 13. Typical vacuum pressures exerted on the surface of the drum 13 during a filtration operation preferably range from about 4 to 12 psig though higher and lower pressures may be employed. Once chosen, a liquid level is conveniently controlled by a valve associated with pipe 86 to control feed charge rates.

Operation of assembly 12 is illustrated by the flow diagram of FIG. 8. The filter aid slurry is conveniently prepared in a tank 91 following which it is discharged into the tank 14 of the rotary vacuum filter assembly 12. In general, the filter aid material is an inert particulate substantially completely water insoluble material having a particle size below about 250 microns (and preferably in the size range of about 50 to 100 microns). A particularly convenient such material is an aluminum calcium silicate, such as Fullers earth, bentonite, diatomaceous earth, amocite asbestos, pulped paper, synthetic or natural fibers, or the like. Conveniently the filter aid is prepared initially as an aqueous slurry of from about 5 to 25 weight percent (total slurry weight) of such particulate material in water. The filter aid is conveniently prepared in a tank 91 following which is discharged into tank 14 of assembly 12.

As the filter aid slurry is discharged into the tank 14, the drum 13 is vacuumized as by means of a vacuum pump 93. Preferably, the drum 13 is equipped with a cloth 80 as hereinabove described before the filter aid is introduced. A receiver 92 is positioned between the vacuum pump 93 and the drum 13 and pump 93 is interconnected to the interior of the drum 13 by means of the conduit 38 and the rotary joint 40. Typical pressures maintained in drum interior surfaces range from about 4 to 12 psia, though higher and lower such pressures and drum speeds may be used.

The filter aid is deposited as a layer 94 (see FIG. 6) upon the cylindrical working surfaces of the drum 13 and is held to such surfaces by the subatmospheric pressures used. Typical starting thicknesses of the layer 94 of filter aid composition upon cylindrical surface portions of drum 13 range from about ½ to 6 inches, and preferably is from about 1 to 2 inches, and the amount of filter aid slurry added is chosen so as to be sufficient to produce a layer of this thickness.

After the filter aid has thus been deposited upon cylindrical surface portions of drum 13, the liquid being filtered is allowed to pass into the tank 14 from tank 90 as by opening the valve 94. A pump (not shown) may be used for such transfer if desired.

Using the above indicated pressures and drum rpm's, a mixture of liquid and solids undergoes filtration in assembly 12 to separate solids from liquids. The liquid or effluent is drawn off and collected in the receiver 92 via conduit 38. The solids are collected as a deposit upon the cylindrical surface portions of drum 13 as a filter cake and are continuously removed along a longitudinal position relative to one side of the rotating drum by the knife 53. While any conventional scraping arrangement can be employed to operate the rotary vacuum filter, in accordance with the teachings of the present invention, it is much preferred to use a scraper blade arrangement, such as illustrated and described herein, which systematically removes the filter cake and a small portion of the filter aid particulate material by cutting action as a layer ranging from about 0.0001 to 0.0010 inches in thickness measured radially relative to the axis of the drum though thinner and thicker layers may be taken off. Such an arrangement is particularly satisfying for filtration purposes, since the solid material may be characteristically in a slimy form which makes separation and removal thereof difficult from the drum of the rotary vacuum filter without the use of the filter aid layer deposited as above described upon the cylindrical surface portions of the drum.

Solids so removed from the drum are found to be in a nearly dry condition characteristically. Preferably the liquid being filtered is continuously fed to the rotary vacuum filter assembly 12 until all of a given batch of such has been charged to filter assembly 12. Preferably, the interrelationship between the amount of liquid composition processed and the thickness of filter aid on the cylindrical surface portions of drum 13 is such that the filter aid is not consumed before the batch is processed. At the end of the processing, the vacuum pump is turned off, the drum 13 is preferably flushed with clear water to remove any filter aid material remaining thereon, and this wash effluent is conveniently returned to the tank 90. The maximum size of a batch being filtered is limited by such factors as the thickness of the filter aid layer on member 20, the r.p.m. of the drum 13, and the transport speed employed to drive knife 53 towards the axis of drum 13.

At the end of a filtration operation, material flow through conduit 86 ceases. Preferably the material flow is changed to a liquid wash system such as water which is used to cleanse the drum 13 and flush the tank 14, during which time the pipe 87 may be open and the vacuum in line 38 cut off, as by a valve (not shown). Alternatively, vacuum may be used in the interior of the drum 13 and line 38 flushed thereby.

As materials are removed from the surface of cylindrical member 20 during operation of the assembly 12, the materials slide downwardly over the surface of blade 53, plate 54 and through apertures formed in the table 62 to be collected in a basket assembly or mechanically conveyed to other equipment (not shown). Wash effluent removed from tank 14 through pipe 87 during a cleanup operation is conveniently returned to tank 90 and may be recharged with a batch to be filtered in a subsequent filtering operation.

Typical screen aperture sizes for the surface of cylindrical member 20 range from about 0.02 to 0.15 inch, though larger and smaller sizes may be used as those skilled in the art will appreciate. A presently preferred size is about 0.05 inch.

No particular critical dimensions are associated with a particular rotary vacuum filter assembly 12, however, it is presently preferred to employ an apparatus which has a drum with a diameter of from about 12 to 48 inches and preferably in the range of from about 24 to 36 inches, and a length of from about 24 to 72 inches.

As the drum 13 revolves through a material to be filtered, a filtration action occurs while the surface of the drum is in the liquid. After the surface of the drum emerges from the unfiltered liquid, but before the filtrate reaches the knife 53, a de-watering action occurs in which free water is drawn away from separated solid materials deposited upon the cylindrical surface of the drum.

While the preceding description illustrates the use of a rotary drum of this invention in a rotary vacuum filter assembly 12 of the type which uses a filter aid, those skilled in the art will appreciate that in place of using a scraper blade one alternatively may use other solids separation measures.

Other and further embodiments and variations of the present invention will become apparent to those skilled in the art from a reading of the present specification taken together with the drawings and no undue limitations are to be inferred or implied from the present disclosure.

The claims are:

1. Precoat vacuum filter apparatus for collecting filtrate within a horizontally rotating filter drum at the approximate level of the axis thereof, said apparatus comprising, in combination:
   a tank member with an open top, sidewalls, and a pair of longitudinally spaced endwalls interconnected therewith,
   a hollow filter drum having an axis and comprising a pair of spaced apart end plate means connected by spaced parallel rods longitudinally arranged to define peripheral surfaces of said drum, said peripheral surfaces being further defined by spaced rods circumferentially arranged around said drum between said end plates, said drum including means for supporting a filter cloth means over said peripheral surfaces, shaft means extending axially in opposed direction from each said end plate means, the shaft means from one said end plate being hollow and being in fluid communication with the interior of said drum at the approximate level of said axis, bearing means adjacent each one of said pair of spaced endwalls for supporting said shaft means and constructed and arranged to locate at least one half of the interior volume of said drum within said tank member, inlet means associated with said tank for supplying liquid to be filtered into said tank in the space therein exteriorly of said drum, outlet means for removing filtered liquid comprising fluid pump means, a rotary coupling means connected to the outward end of said hollow shaft means, and pipe means interconnecting said fluid pump means and said rotary coupling, agitator means located in said tank exteriorly of said drum for maintaining solid materials suspended in liquid in said tank, blade means with an edge thereof adjustably spaced apart from said peripheral surfaces along the length thereof, and drive means constructed and arranged to rotate said drum, to operatively power said fluid pump means and said agitator means, and to adjustably locate said blade edge relative to said peripheral surfaces, whereby liquid filtered by said hollow drum through a filter cloth thereon is retained within the interior thereof at a liquid level about said approximate level and filtrate liquid above said approximate level is removed from the interior of said drum by said fluid pump means through said hollow shaft means.

2. The filter apparatus of claim 1 additionally including filter cloth means circumferentially extending over and supported by said peripheral surfaces.

3. The filter apparatus of claim 1 where, in said drum, the radially inner edge portions of said circumferentially arranged rods adjoin the radially outer edge portions of said longitudinally arranged rods at respective cross-over positions, and weld means secures said circumferentially arranged rods to said longitudinally arranged rods at said respective cross-over positions.

4. The filter apparatus of claim 1 wherein said agitator means is suspended from said shaft means.

5. The filter apparatus of claim 1 wherein:

said blade means includes transport means interconnected with said blade means to radially advance and retract said blade means relative to said drum, said drive means for said blade edge continuously advances said blade means at a predetermined rate towards aid peripheral surfaces, and said blade means further includes release means to disengage said drive means from said blade edge to permit return of said blade edge away from said periphereal surfaces to a predetermined position radially spaced from said periphereal surfaces.

6. The filter apparatus of claim 1 wherein said drive means includes:

first motor means constructed and arranged to drive rotatably said shaft means, second motor means constructed and arranged to drive said fluid pump means, third motor means constructed and arranged to move said agitator means, and fourth motor means constructed and arranged to advance said blade means radially towards said periphereal surfaces.

7. The filter apparatus of claim 1 wherein said fluid pump means generates subatmospheric pressures.

8. The filter apparatus of claim 7 wherein a receiver means is interconnected with said conduit means between said fluid pump means and said rotary coupling.

* * * * *